(12) United States Patent
Drumm

(10) Patent No.: US 8,350,831 B2
(45) Date of Patent: Jan. 8, 2013

(54) METHOD AND APPARATUS FOR DETECTING A MULTITOUCH EVENT IN AN OPTICAL TOUCH-SENSITIVE DEVICE

(75) Inventor: Owen Drumm, Dublin (IE)

(73) Assignee: Rapt IP Limited, Gibraltar (GI)

( * ) Notice: Subject to any disclaimer, the term of this patent is extended or adjusted under 35 U.S.C. 154(b) by 0 days.

(21) Appl. No.: 13/059,817

(22) PCT Filed: Aug. 7, 2009

(86) PCT No.: PCT/EP2009/005736
§ 371 (c)(1),
(2), (4) Date: Feb. 18, 2011

(87) PCT Pub. No.: WO2010/015408
PCT Pub. Date: Feb. 11, 2010

(65) Prior Publication Data
US 2011/0157096 A1 Jun. 30, 2011

(30) Foreign Application Priority Data

Aug. 7, 2008 (IE) .................................. S2008/0652
Oct. 10, 2008 (IE) .................................. S2008/0827

(51) Int. Cl.
*G06F 3/042* (2006.01)
*G06F 3/041* (2006.01)
(52) U.S. Cl. ........................ 345/175; 345/173
(58) Field of Classification Search .......... 345/156–184; 178/18.01–20.04
See application file for complete search history.

(56) References Cited

U.S. PATENT DOCUMENTS

| 3,673,327 | A | 6/1972 | Johnson et al. |
| 3,867,628 | A | 2/1975 | Brown |
| 4,067,925 | A | 1/1978 | Zahner |
| 4,243,879 | A | 1/1981 | Carroll et al. |
| 4,247,767 | A | 1/1981 | O'Brien et al. |
| 4,254,333 | A | 3/1981 | Bergstrom |
| 4,267,443 | A | 5/1981 | Carroll et al. |
| 4,301,447 | A | 11/1981 | Funk et al. |
| 4,384,201 | A | 5/1983 | Carroll et al. |

(Continued)

FOREIGN PATENT DOCUMENTS

CN 101071356 A 11/2007

(Continued)

OTHER PUBLICATIONS

PCT International Search Report and Written Opinion, PCT/EP2009/005736, Dec. 7, 2009, 10 pages.

(Continued)

*Primary Examiner* — Alexander Eisen
*Assistant Examiner* — Patrick F Marinelli
(74) *Attorney, Agent, or Firm* — Fenwick & West LLP

(57) ABSTRACT

A touch sensitive optical control device comprising a set of light emitters 14, 22 and light detectors 18, 24 arranged relative to a touchable surface 30 such that light transmitted by the emitters is received by the detectors along multiple intersecting beams which pass transversely of the surface and touching the surface at a beam interrupts the light transmitted along the beam. Candidate touch points T1, T2, F1, F2 are defined at the intersections of interrupted beams and are confirmed or not as actual touch points by examining test beams 40, 42, 54, 56 near to or coincident with the candidate touch point.

24 Claims, 15 Drawing Sheets

U.S. PATENT DOCUMENTS

| | | | |
|---|---|---|---|
| 4,459,476 | A | 7/1984 | Weissmueller et al. |
| 4,467,193 | A | 8/1984 | Carroll |
| 4,498,001 | A | 2/1985 | Smoot |
| 4,591,710 | A | 5/1986 | Komadina et al. |
| 4,645,920 | A | 2/1987 | Carroll et al. |
| 4,672,364 | A | 6/1987 | Lucas |
| 4,684,801 | A | 8/1987 | Carroll et al. |
| 4,703,316 | A | 10/1987 | Sherbeck |
| 4,713,534 | A | 12/1987 | Masters et al. |
| 4,725,726 | A | 2/1988 | Hasegawa et al. |
| 4,746,770 | A * | 5/1988 | McAvinney ............ 178/18.09 |
| 4,761,637 | A | 8/1988 | Lucas et al. |
| 4,794,248 | A | 12/1988 | Gray |
| 4,799,044 | A | 1/1989 | Masters et al. |
| 4,818,859 | A | 4/1989 | Hough |
| 4,847,606 | A | 7/1989 | Beiswenger |
| 4,855,590 | A | 8/1989 | Bures et al. |
| 4,893,120 | A | 1/1990 | Doering et al. |
| 4,899,138 | A | 2/1990 | Araki et al. |
| 4,912,316 | A | 3/1990 | Yamakawa |
| 4,943,806 | A | 7/1990 | Masters et al. |
| 4,963,859 | A | 10/1990 | Parks |
| 4,988,983 | A | 1/1991 | Wehrer |
| 4,990,901 | A | 2/1991 | Beiswenger |
| 5,136,156 | A | 8/1992 | Nounen et al. |
| 5,146,081 | A | 9/1992 | Heikkinen et al. |
| 5,355,149 | A | 10/1994 | Casebolt |
| 5,414,413 | A | 5/1995 | Tamaru et al. |
| 5,635,724 | A | 6/1997 | Higgins |
| 5,714,909 | A | 2/1998 | Jackson |
| 5,838,308 | A | 11/1998 | Knapp et al. |
| 6,429,857 | B1 * | 8/2002 | Masters et al. ............ 345/175 |
| 6,495,832 | B1 | 12/2002 | Kirby |
| 6,556,149 | B1 | 4/2003 | Reimer et al. |
| 6,597,348 | B1 | 7/2003 | Yamazaki et al. |
| 6,690,363 | B2 | 2/2004 | Newton |
| 6,765,193 | B2 | 7/2004 | Sumriddetchkajorn |
| 6,803,825 | B2 | 10/2004 | Chiou et al. |
| 6,972,753 | B1 | 12/2005 | Kimura et al. |
| 7,265,748 | B2 | 9/2007 | Ryynanen |
| 7,295,329 | B2 | 11/2007 | Gruhlke et al. |
| 7,310,090 | B2 | 12/2007 | Ho et al. |
| 7,355,593 | B2 | 4/2008 | Hill et al. |
| 7,385,170 | B1 | 6/2008 | Krumberger |
| 7,538,759 | B2 * | 5/2009 | Newton ..................... 345/173 |
| 8,167,698 | B2 * | 5/2012 | Van De Wijdeven et al. .. 463/14 |
| 2002/0075243 | A1 * | 6/2002 | Newton ..................... 345/173 |
| 2004/0252091 | A1 | 12/2004 | Ma et al. |
| 2004/0263482 | A1 | 12/2004 | Goertz |
| 2006/0114237 | A1 * | 6/2006 | Crockett et al. ............ 345/173 |
| 2006/0227120 | A1 | 10/2006 | Eikman |
| 2007/0052693 | A1 * | 3/2007 | Watari ..................... 345/175 |
| 2007/0165008 | A1 | 7/2007 | Crockett |
| 2008/0088603 | A1 | 4/2008 | Eliasson et al. |
| 2008/0150906 | A1 * | 6/2008 | Grivna ..................... 345/173 |
| 2008/0192015 | A1 * | 8/2008 | Lieberman ................ 345/173 |

FOREIGN PATENT DOCUMENTS

| | | |
|---|---|---|
| CN | 101075168 A | 11/2007 |
| CN | 101110008 A | 1/2008 |
| CN | 101149656 A | 3/2008 |
| EP | 0304820 A2 | 3/1989 |
| EP | 0 601 651 A1 | 6/1994 |
| EP | 0601651 A1 | 6/1994 |
| GB | 2133537 A | 7/1984 |
| GB | 2171195 A | 8/1986 |
| WO | WO 2006/095320 | 9/2006 |

OTHER PUBLICATIONS

PCT International Preliminary Report on Patentability, PCT/EP2009/005736, Feb. 8, 2011, 11 pages.

PCT International Search Report and Written Opinion, PCT/EP2009/005739, Feb. 5, 2010, 7 Pages.

Johnson M.et al., "Enhanced Optical Touch Input Panel," IP.COM PriorArt Database, Technical Disclosure, IP.COM Inc., Sep. 1, 1985, 3 Pages, West Henrietta, NY.

"WPI Acc No. 2008-D85919/200828," Dialog (R) File 351: Derwent WPI, Thomson Reuters, 2011, 5 pages.

"WPI Acc No. 2008-D86320/200828," Dialog (R) File 351: Derwent WPI, Thomson Reuters, 2011, 3 pages.

"WPI Acc No. 2008-F41190/200836," Dialog (R) File 351: Derwent WPI, Thomson Reuters, 2011, 3 pages.

"WPI Acc No. 2008-F03364/200835," Dialog (R) File 351: Derwent WPI, Thomson Reuters, 2011, 4 pages.

Cummings, T.F., "Transparent Keyless Keyboard for Variable Terminal Applications," IBM Technical Disclosure Bulletin, Sep. 1977, pp. 1609-1611, vol. 20, No. 4.

Baumann, D.D., "Optical Data Input Device," IBM Technical Disclosure Bulletin, Mar. 1969, pp. 1281-1282, vol. 11, No. 10.

Thompson, D.R., "Finger Position Detect Method," IBM Technical Disclosure Bulletin, Dec. 1980, p. 3289, vol. 23, No. 7B.

Callens, P., "Optical Keyboard Device and Technique," IBM Technical Disclosure Bulletin, Nov. 1983, pp. 2763-2764, vol. 26, No. 6.

"Enhanced Optical Touch Input Panel," IBM Technical Disclosure Bulletin, Sep. 1985, pp. 1760-1762, vol. 28, No. 4.

* cited by examiner

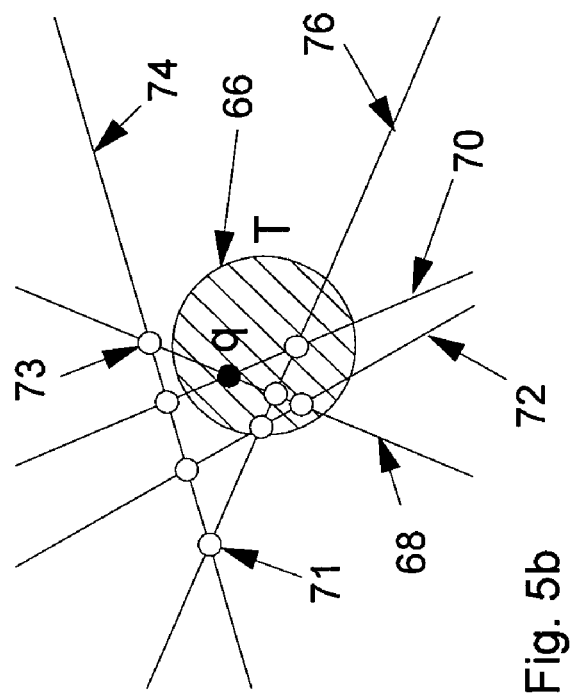
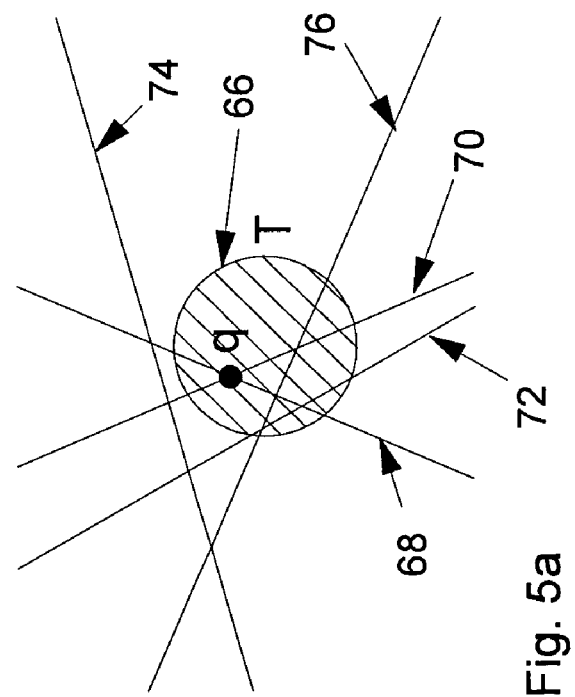

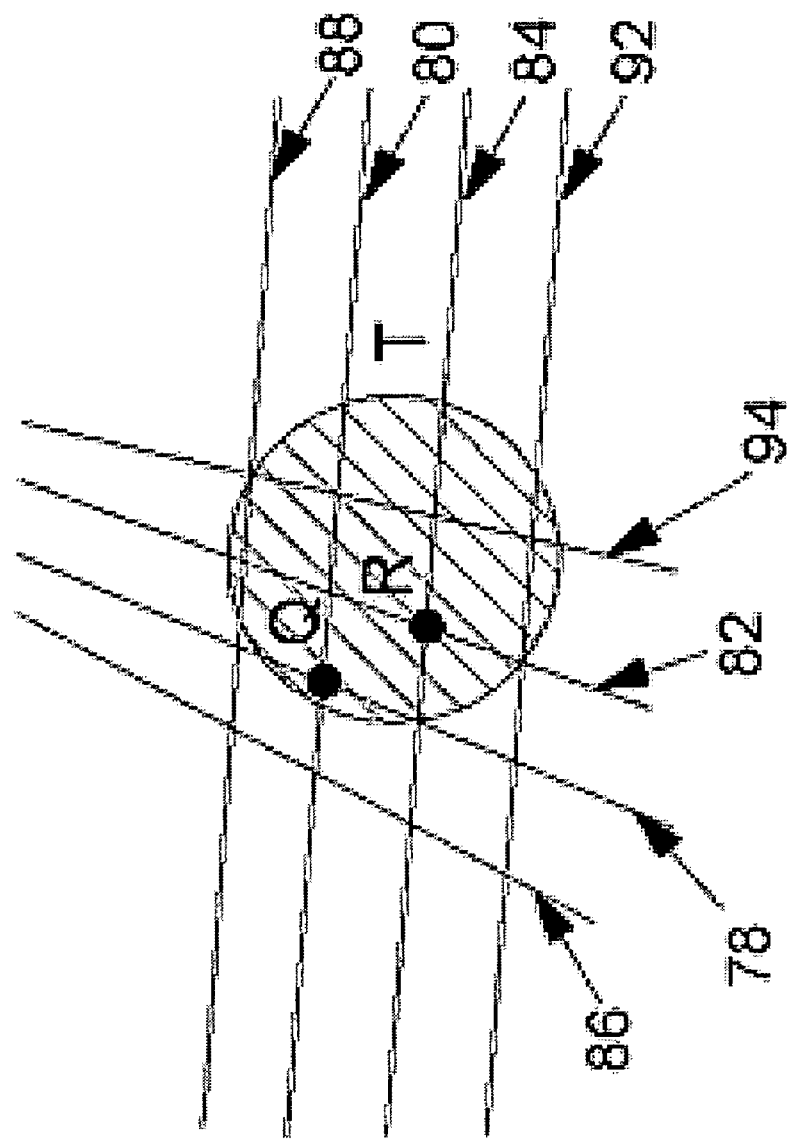

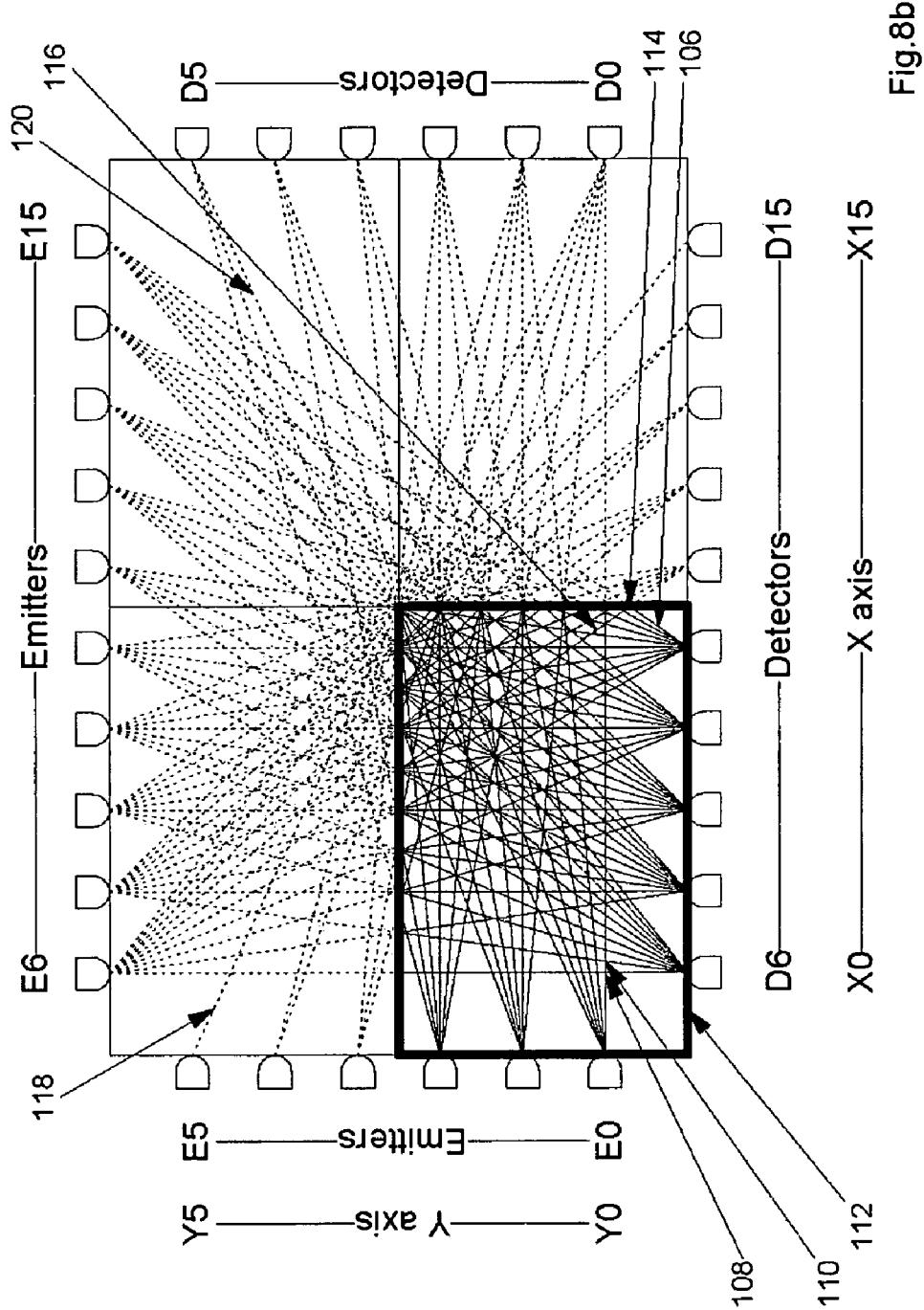

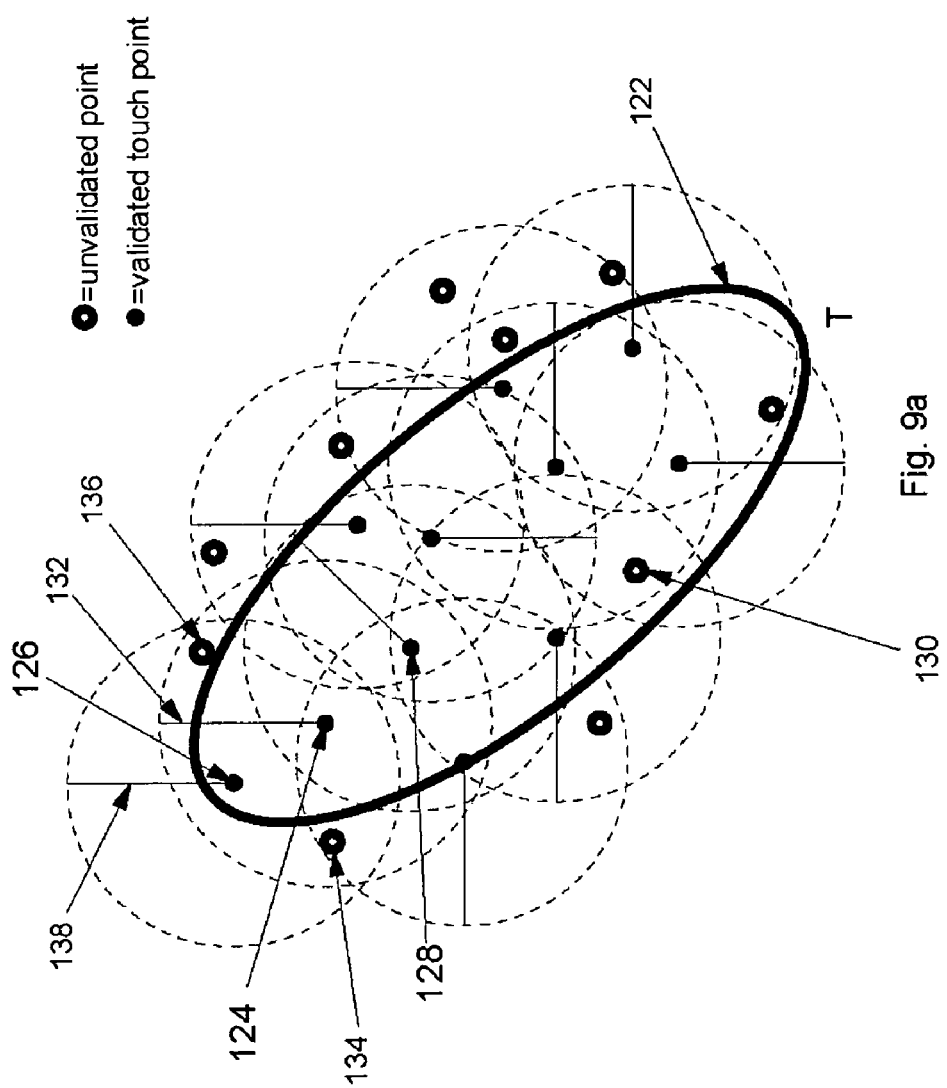

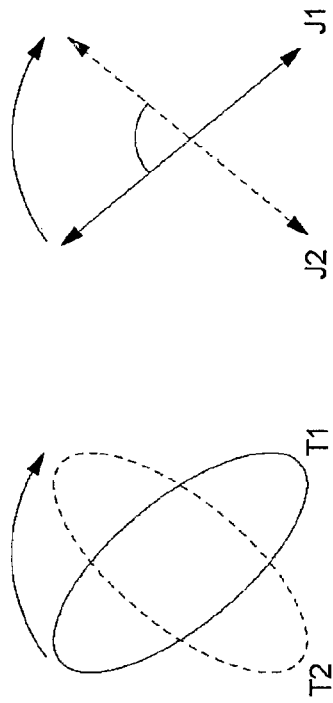
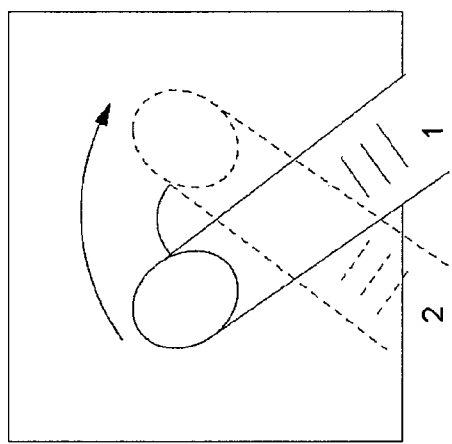
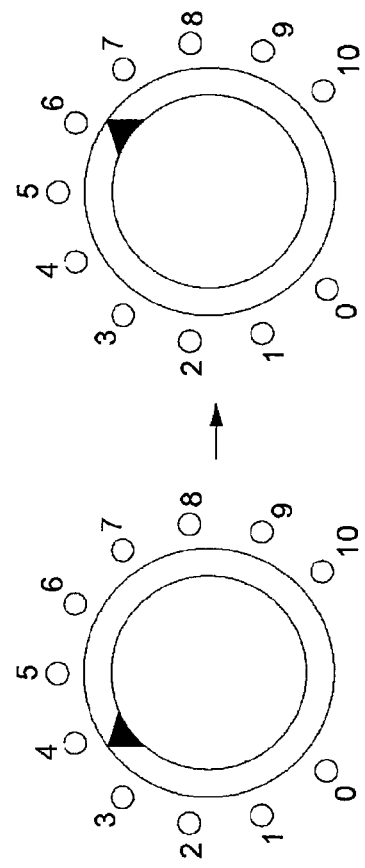
Fig. 11c
Fig. 11b
Fig. 11a
Fig. 11e
Fig. 11d

METHOD AND APPARATUS FOR DETECTING A MULTITOUCH EVENT IN AN OPTICAL TOUCH-SENSITIVE DEVICE

The present invention relates to a method and apparatus for detecting a touch point in a touch-sensitive device.

BACKGROUND

Referring to FIG. 1, in a conventional optical touch overlay, optical emitters 14, 22 and detectors 18, 24 are arranged along opposite edges of a rectangular touch sensitive surface 16 and an orthogonal grid is formed by the optical beams 12, 20 transmitted between the emitters and the corresponding detectors. As used herein, the term "beam" means the light passing along a narrow optical path between an emitter and a detector, and does not imply that any given emitter necessarily emits light in one or more discrete, directed beams although, in the case of FIG. 1, each emitter only emits light over a narrow angle to ensure that only the directly opposite detector receives light from it. Furthermore, the term "light" includes IR and UV radiation, and the term "optical" is to be interpreted accordingly.

The touch sensitive surface may be an optically transparent planar waveguide through which the beams pass by total internal reflection, or a surface over which the beams pass in close proximity to the surface and substantially parallel to the surface.

In the case of a waveguide, the material used could be a transparent sheet of plastic or glass. An object such as a finger or a stylus coming into contact with the transparent waveguide will have a higher refractive index than the air normally surrounding the waveguide. Over the area of contact, the increase in refractive index will disturb the total internal reflection of the beams within the waveguide. The disruption of total internal reflection increases the light leakage from the waveguide, attenuating any beams passing through the position of the touch event. Correspondingly, the removal of the touching object will cause the attenuation of the passing beams to be reduced. Such changes in attenuation are detectable at the output of the associated detectors. When the touch sensitive surface is a surface over which the beams pass, an object which is not optically transparent at the wavelength in use will attenuate or interrupt the beams passing through the object location. In either case, a beam is deemed interrupted if its amplitude, as detected by the relevant detector, falls below a predetermined or adaptively calculated threshold value $T_h$.

The emitters 14, 22 and detectors 18, 24 are driven by a controller 200 via drive circuits 210. The controller 200, which may, for example, comprise a suitably programmed microprocessor or a PLA, also serves to process the data output from the detectors, after analogue to digital conversion, to determine the location of a touch point. The beams are scanned in sequence and logic in the CPU can determine the intersection point of one or more interrupted beams and deduce the position of the interrupting object. The object must be large enough to detectably attenuate at least one beam in one axis and at least one beam in the orthogonal axis, so resolution is typically quite poor unless large numbers of emitters and/or detectors are used. By scanning the beams we mean sampling the detector outputs to determine the amplitude of the, or each, beam falling on each detector.

The use of an orthogonal grid of beams is effective when at most one opaque object is to be located in the touch sensitive area because the central position of that object can be completely described by a pair of orthogonal coordinates yielded by the scanning process.

U.S. Pat. No. 4,301,447 (Funk et al.) discloses a mechanism for detecting the interruption of the beams between any given emitter and some or all of the detectors along the opposing edge of the touch sensitive surface for the purposes of increasing the resolution of the touch sensing mechanism.

Patents EP 0601651A1 and U.S. Pat. No. 5,635,724 disclose methods for processing the detector outputs from such a scanning system in order to resolve the centrelines of the shadows cast when an interrupting object is placed in the path of an emitter with a diverging pattern of radiation.

In these disclosures, the resolution is improved, but there is no accommodation for multiple simultaneous touch events. As shown in FIG. 2a, the coordinates generated by such a system in the presence of more than one interrupting object 26, 28 can be ambiguous because the beams associated with one touch point could intersect with the beams of another touch point and indicate the possible presence of at least one false additional touch point. For example, two pairs of interrupted orthogonal beams could indicate between two and four simultaneous touch events at the corners of the rectangle described by the four intersecting beams.

In FIG. 2a, two touch events 26 and 28 at locations T1 and T2 respectively in the touch sensitive surface 30 interrupt beams 32 and 34 in one axis and beams 36 and 38 in the other axis. It is evident from the drawing that with only this information, associated logic circuitry cannot determine with certainty whether there are touch events at locations T1 and T2 or at locations F1 and F2 or at some combination of these locations which is consistent with the interruption of the four beams 32, 34, 36 and 38.

IBM Technical Disclosure Bulletin Vol. 28, No. 4, September 1985 pages 1760-1762 ("Enhanced Optical Touch Input Panel"), M. Johnson, discloses the use of a bitmap of the touch sensitive surface onto which is mapped the triangular shadow areas of such diverging interrupted beams from successively activated emitters around the periphery of the touch sensitive surface. The method disclosed consists of initialising all of the bitmap points to the same value at the outset and setting the bitmap points to the opposite value at all the points along beams which are not interrupted when the first emitter is activated. Subsequently, the first emitter is deactivated and the next emitter is activated and again any points along beams, which are not interrupted are set to the opposite value to that set at initialisation. Having sequentially activated all of the emitters and having processed the bitmap points in this way for each emitter activation time, the final bitmap will retain the initialised values only in those points which are traversed by beams which were interrupted for all emitter activation times and so are most likely to correspond to real touch events.

The use of a constant resolution Cartesian bitmap with the minimum spacing between intersection points throughout would be very wasteful of RAM storage and processing power. To apply the bitmapped method of IBM in a typical application (perhaps 16 emitters and 16 detectors) with a reasonable response time means either resolution must be reduced or considerable resources made available. As such, this bitmapped approach is only reasonable for low resolution applications.

It is therefore an object of the present invention to resolve the location of one or more simultaneous touch events within the touch sensitive area with high resolution and without requiring excessive processing power or storage or the use of expensive optical sensors such as integrated linear detector arrays or cameras.

DISCLOSURE OF THE INVENTION

Accordingly, there is provided a method for determining a touch point in a touch-sensitive optical device comprising a plurality of optical emitters and a plurality of optical detectors, the optical emitters and the optical detectors defining therebetween a plurality of optical beam paths forming an optical beam intersection pattern extending over an area, the method comprising the steps of:
  detecting a modulation of energy transmitted along each of a pair of optical beam paths;
  assigning a candidate touch point at the intersection of said pair of modulated beams;
  analyzing predetermined other beams near to or coincident with said candidate touch point; and
  responsive to said analysis, determining whether the candidate touch point is an actual touch point.

Preferably, said step of assigning is based on a function of the degree of modulation of the predetermined other beams.

Preferably, the contributions of the predetermined other beams are weighted in said function dependent on the degree of modulation.

Preferably, the weighting for each predetermined other beam depends upon one or more of: the proximity of the predetermined other beam to the candidate touch point; the angle of the predetermined other beam to the angle of the beams defining the candidate touch point; and the number of predetermined other beams.

Preferably, the step of analyzing is based on predetermined other beam intersection points near to or coincident with said candidate touch point.

Preferably, the method further comprises the step of retrieving stored data from a database defining the predetermined other beams or predetermined other beam intersections for each beam intersection point, said step of analyzing based at least in part on said stored data.

Preferably, the stored data includes respective weighting and/or proximity values relating to the predetermined other beams or predetermined other beam intersections.

Preferably, the beam intersection pattern is symmetrical about at least one axis of the area of optical beam paths, wherein said step of retrieving comprises retrieving stored data regarding beams on one side of said at least one axis, the method further comprising the step of extrapolating the beam data for the beams on the symmetrically opposite side of said at least one axis based on said stored data.

Preferably, the method further comprises the step of designating said modulation as an interruption of the beam if said modulation exceeds a threshold level, and wherein in said step of assigning, said candidate touch point is assigned at the intersection of a pair of interrupted beams.

Preferably, said threshold level is an adaptive threshold level.

Preferably, said step of designating comprises comparing the detected modulation with a predefined modulation level for that touch point region.

Preferably, the method comprises the step of retrieving data indicative of a typical modulation level for an actual touch point for that touch point region.

Preferably, said data comprises one or more of the following: the number of beams passing through the touch point region; the number of intersections of beams falling within the touch point region; or maximum modulation to be expected in the touch point region.

Preferably, the method further comprises the step of grouping actual touch points into clusters based on a search radius distance from a cluster member to at least one other member of the same cluster.

Preferably, said beam intersection pattern is non-uniform and said search radius distance varies according to the position of the cluster member in the beam intersection pattern.

Preferably, the method further comprises the step of estimating the centre of a cluster as the average position of all of the cluster members.

Preferably, the method further comprises the step of estimating the centre of a cluster as the centre of a bounding rectangle around the cluster.

Preferably, the method further comprises the step of estimating the centre of a cluster as the average position of outlying cluster members.

Preferably, said estimation step is based on a weighted average, the weights depending on the degree of modulation of the beams at each point contributing to the average.

Preferably, the method further comprises the step of determining the orientation of a non-circular touch contact area.

Preferably, in said determining step, the orientation is determined by mathematically rotating at least two confirmed touch points lying on or near the perimeter of the contact area around the estimated centre of the contact area and determining the minimum or maximum average absolute value of the distance between each touch point and a fixed axis.

Preferably, the method comprises the steps of:
(i) initialising a point validity value for said candidate touch point;
(ii) selecting a predetermined other beam near to or coincident with said candidate touch point;
(iii) measuring the strength of said predetermined other beam;
(iv) calculating an attenuation margin for said predetermined other beam based on said measured beam strength;
(v) multiplying said attenuation margin by a weighting value;
(vi) adding the weighted attenuation margin to said point validity value;
(vii) repeating steps (ii)-(vi) for a plurality of predetermined other beams near to or coincident with said candidate touch point;
(viii) normalizing said point validity value; and
(ix) if said point validity value exceeds a threshold value, designating said candidate touch point as an actual touch point.

Preferably, said point validity value is initialised to 0.

Preferably, step (iv) comprises subtracting a threshold value from said measured beam strength.

Preferably, step (viii) comprises dividing said point validity value by the number of predetermined other beams.

Preferably, the method further comprises the step of storing an indication of said actual touch point in a validated point list.

Preferably, the method further comprises the step of determining if a candidate touch point is near the boundary of a touch event, and wherein said steps of analyzing and determining whether the candidate touch point is an actual touch point are carried out only in respect of those candidate touch point near the boundary of a touch event.

There is also provided a touch-sensitive optical device comprising a plurality of optical emitters and a plurality of optical detectors, the optical emitters and the optical detectors arranged relative to a touchable surface such that energy transmitted by the emitters is received by the detectors along multiple intersecting beams which pass adjacent the surface, and wherein touching the surface at a beam causes a detectable modulation of the energy transmitted along the beam, the device further comprising a processing means operable to perform the following steps:

(i) detect a modulation of energy transmitted along an optical beam path;
(ii) assign a candidate touch point at the intersection of a pair of modulated beams;
(iii) analyze predetermined other beams near to or coincident with said candidate touch point; and
(iv) responsive to said analysis, determine whether the candidate touch point is an actual touch point.

There is further provided a touch sensitive optical control device comprises a set of light emitters and a set of light detectors arranged relative to a touchable surface such that light transmitted by the emitters is received by the detectors along multiple intersecting beams which pass transversely of the surface and touching the surface at a beam causes a detectable modulation of the light transmitted along the beam, such modulation if sufficiently large being registered as an interruption of the beam by an associated processing means, wherein the processing means defines candidate touch points at the intersections of interrupted beams and confirms or not each candidate touch point as an actual touch point by examining predetermined other beams (test beams) near to or coincident with the candidate touch point.

Since test beams are likely to intersect at a point which is close to or coincident with the candidate touch point, test beam intersection points may optionally be examined to confirm each candidate touch point as an actual touch point.

The invention is especially valuable in a multi-touch system, where the intersection of two beams alone may be inconclusive.

The invention provides a low cost optical touch overlay with high resolution and multi-touch capability.

Embodiments of the invention provide further details about the touch points, such as the centre, size and orientation of each touch point contact area as well as the efficient calculation of these values.

BRIEF DESCRIPTION OF THE DRAWINGS

Embodiments of the present invention will now be described, by way of example, with reference to the accompanying drawings, in which:

FIG. 5a illustrates the use of nearby beams to validate a candidate touch point.

FIG. 5b illustrates the use of nearby beam intersections to validate a candidate touch point.

FIG. 7a illustrates the preferential validation of boundary points of the contact area of a touch event.

FIG. 7b is a modification of the flowchart of FIG. 6b which implements the principle of FIG. 7a.

FIGS. 8a and 8b show how data storage requirements can be reduced by taking advantage of beam symmetry.

FIG. 9a shows how validated points relating to a touch event may be gathered into a cluster.

FIG. 11 shows how the orientation of a cluster which is substantially non-circular can be used as a control value.

DESCRIPTION OF PREFERRED EMBODIMENTS

Figure 2B:
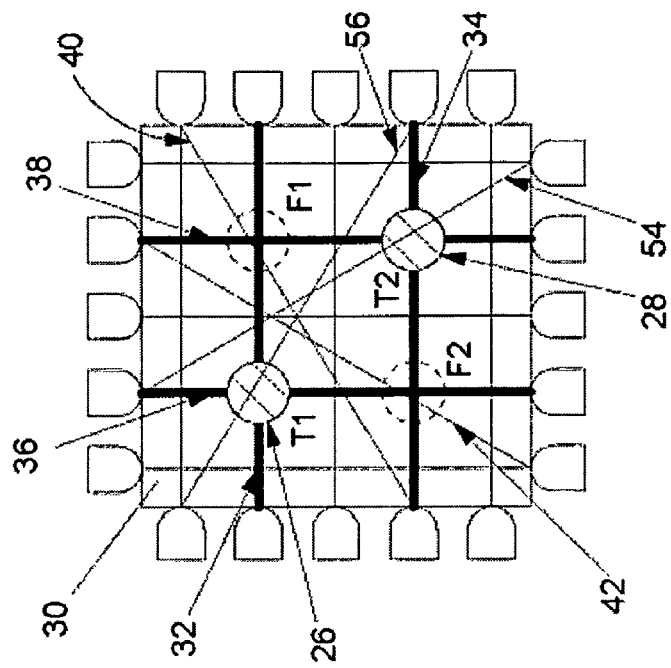
FIG. 2b shows the elimination of false touch points in the overlay of FIG. 1 using additional nearby beams.
Figure 2A:
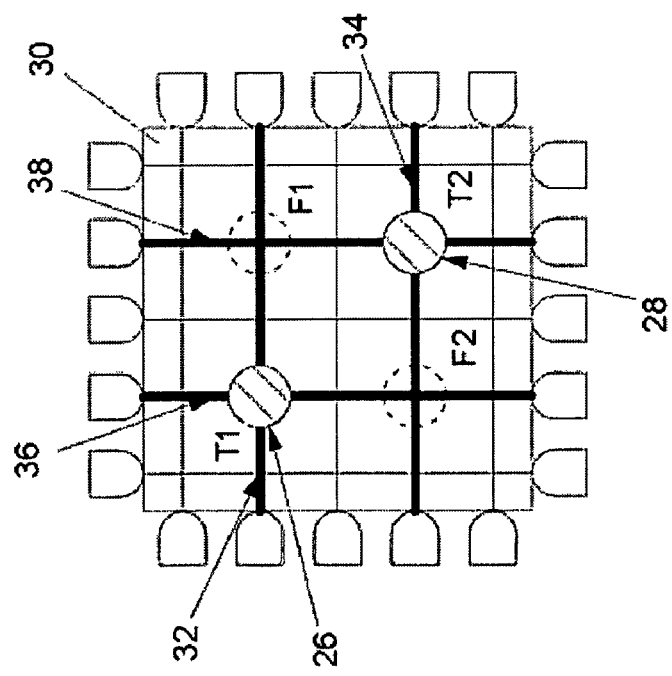
FIG. 2a shows the ambiguity which can arise when there are multiple touch points in the overlay of FIG. 1.

In the present embodiment, in order to resolve the ambiguity of multiple touches within a touch area, a plurality of beam intersections are tested for interruption, where the tested beams are coincident with, or close to, each indicated candidate touch point. The principle is shown in FIG. 2b, where additional beams 40 and 42, if present, can be used to determine the likelihood of touch events at locations F1 and F2 on the touch sensitive surface 30 of FIG. 2a.

The beam 40 is near to, and almost coincident with, the intersection of the interrupted beams 32 and 38, so anything other than a very small object present at location F1 will interrupt beams 32, 38 and 40. Similarly, the beam 42 is almost coincident with the intersection of interrupted beams 34 and 36 at location F2. The status of these two additional beams 40 and 42, along with the status of the additional beams 54 and 56 passing through T1 and T2, can be used to determine without ambiguity at which of the locations T1, T2, F1 and F2 there are touch events.

Figure 3:
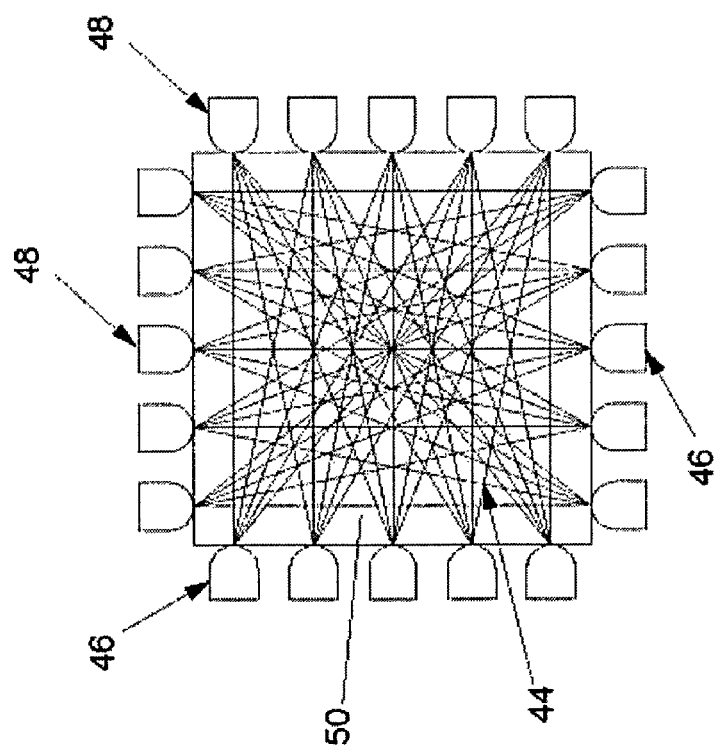
FIG. 3 is a schematic diagram of an optical touch sensitive overlay used in an embodiment of the invention.

In the present embodiment, emitters with wide radiant angles and detectors with wide acceptance angles are arranged around the entire periphery of a touch sensitive surface to maximise the number and angular span of beam angles available to resolve ambiguous beam intersections. This is shown in FIG. 3, where a set of intersecting beams 44 pass between emitters 46 with wide radiant angles and detectors 48 with wide acceptance angles across a touch sensitive surface 50. It is evident from this figure that the number of beams 44 available for touch detection and their closely spaced intersections vis-à-vis the configuration of FIG. 1 offers the potential to determine object positions with high resolution in those regions although the number of emitters 46 and detectors 48 is the same. Where the emitters and detectors are equal in number and equally spaced, many of the intersections between beams will be coincident with other beam intersections, which is particularly useful for increasing the accuracy of detection.

Figure 4:
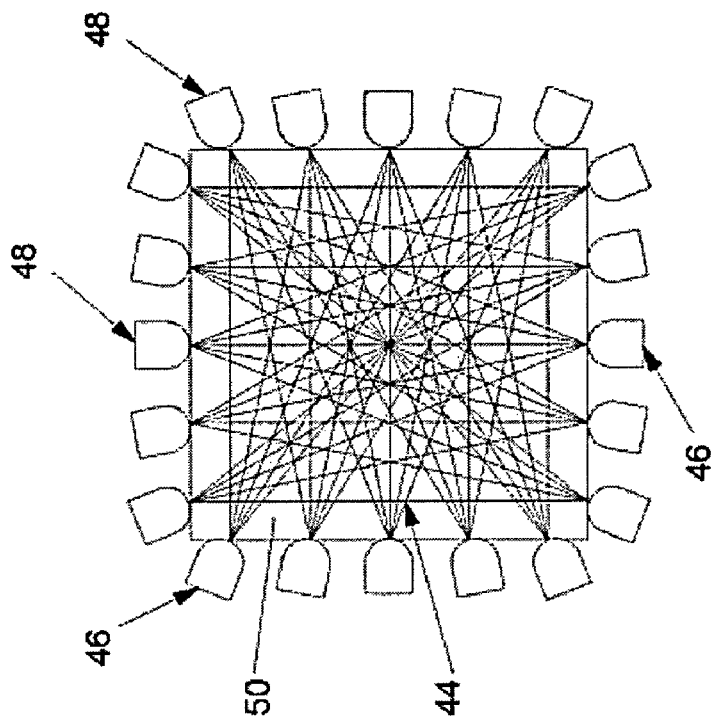
FIG. 4 shows how the axes of the emitters and detectors of FIG. 3 can be orientated relative to the touch sensitive surface for maximum coverage.

If desired, and as shown in FIG. 4, the radiant pattern of each emitter 46 can be directed to be received optimally at the maximum number of detectors 48 by orienting the emitter 46 accordingly or by the use of lenses, waveguides or mirrors. The orientation of the acceptance angle of each detector 48 can be similarly optimised.

Figure 1:
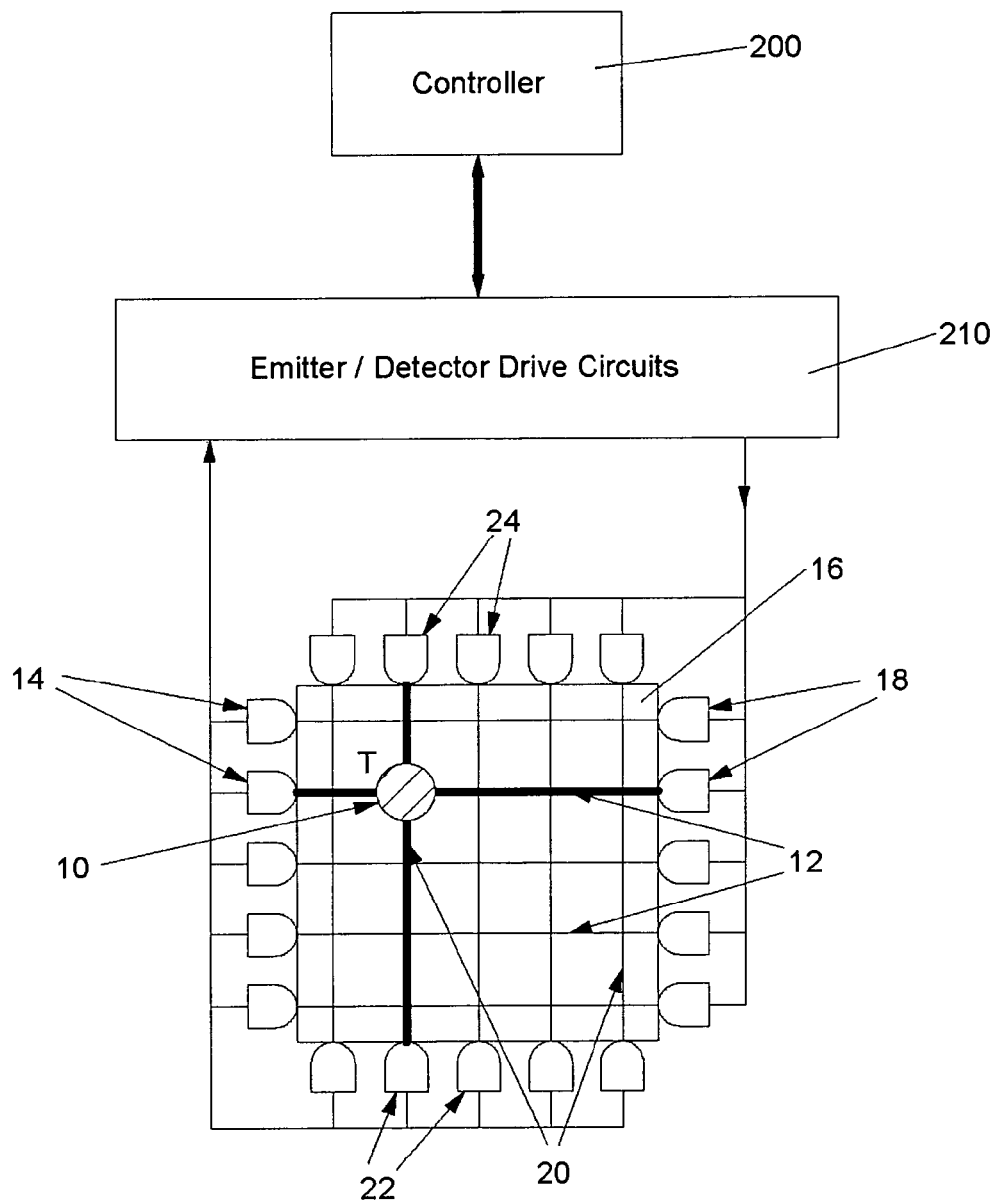
FIG. 1 is a schematic diagram of a conventional optical touch sensitive overlay and associated circuitry with an orthogonal arrangement of beams extending between emitters and detectors.

In either case the array of emitters and detectors is driven by drive circuits 210 and a controller 200, generally such as shown and described with respect to FIG. 1.

FIG. 5a shows a touch event 66 which includes a candidate touch point P at the intersection of beams 68 and 70. By a candidate touch point we mean the intersection point of two interrupted beams. A candidate touch point can be an actual touch point, as shown in FIG. 5a where the touch point P is caused by actual interruption of the beams 68 and 70 at the touch event 66, or it could be caused by the interruption in the beams by touch events elsewhere on the touch sensitive surface.

In the present embodiment, two beams which have been interrupted in a way consistent with a touch event are tested to see if they intersect and if so, the intersection of the pair is considered to be a candidate touch point. A candidate point is validated (confirmed) or eliminated by inspection of coincident or nearby beams (test beams). If an attenuating object is actually present at the candidate touch point, any test beam passing through that point should be similarly interrupted. Test beams which are near to the candidate intersection point will typically exercise a greater influence on the validation process than those which are more distant.

In the example shown in FIG. 5a, beams 72, 74 and 76 are tested to see if they are also interrupted and if so, the point P is deemed to be valid. Since none of the beams 72, 74 or 76 is coincident with the intersection point P of beams 68 and 70, a weighted sum of their status values is used to determine the likelihood that the candidate point P is valid. Beams 72 and 76 are both interrupted and only beam 74 is not interrupted, so because beams 72 and 76 are both nearer to the candidate touch point P, the present embodiment would deem point P to be valid.

The weighting value associated with a test beam which is coincident with the candidate touch point, but not interrupted, will normally be set high enough to outweigh the combined validating effect of any number of nearby or coincident beams which are interrupted. This is to ensure that an uninterrupted beam passing through a point prevents that point becoming validated as a touch point. However, there may be circumstances (such as a low signal-to-noise ratio in the scanning mechanism) where a smaller difference between the negating effect of an uninterrupted beam and the validating effect of an interrupted beam is appropriate.

Ideally, many or all of the beams within close range of a candidate touch point are tested to determine whether it represents a genuine touch event or not. If a limited number of beams are to be tested for each candidate point to minimise processing time, the beams selected should be chosen at least in part by their angles relative to the angles of the beams in the candidate point; testing with a wide range of beam angles increases the chance of eliminating a false touch point.

Therefore, the weighting values for a beam should include some combination of proximity to candidate touch point, difference in angle from the beams defining the candidate touch point and the number (or density) of beams near to the candidate touch point. Weighting values can be calculated as needed or can be retrieved from lookup tables or lists.

To determine the intersection point of two beams, well known geometric and algebraic methods may be used, and given the limited number of beam angles found in such a system, advantageous use may be made of trigonometric lookup tables as is well known.

Further computational advantage may be gained by using lists or lookup tables of information about the intersection point of at least two beams, such as the Cartesian coordinates of the point and the nearby beams or coincident beams or nearby points which should be tested to validate the point.

Optionally, a candidate point is validated (confirmed) or eliminated by inspection of coincident or nearby intersection points of beams. Test beam intersection points which are near to the candidate point will typically exercise a greater influence on the validation process than those which are more distant.

FIG. 5b shows intersection points (such as example points 71 and 73) which are near to the candidate touch point q which may be used in the validation or elimination of touch point q. The test intersection point 71, at the intersection of beam 74 and beam 76, is more distant from candidate touch point q than intersection point 73 at the intersection of beam 68 and beam 74, and this typically results in the influence of test point 73 on the validation processing being greater than the influence of test point 71. The candidate point q is validated as a real touch point if the nearby and coincident test intersection points are consistent with a touch at candidate touch point q.

The criteria used will be similar to those used for nearby beams, such as the depth of modulation of the beams intersecting at the test intersection point, the angles of the beams intersecting at the test intersection point, the proximity of the test intersection point to the candidate touch point and the number (or density) of beams close to the candidate touch point.

Figure 6A:
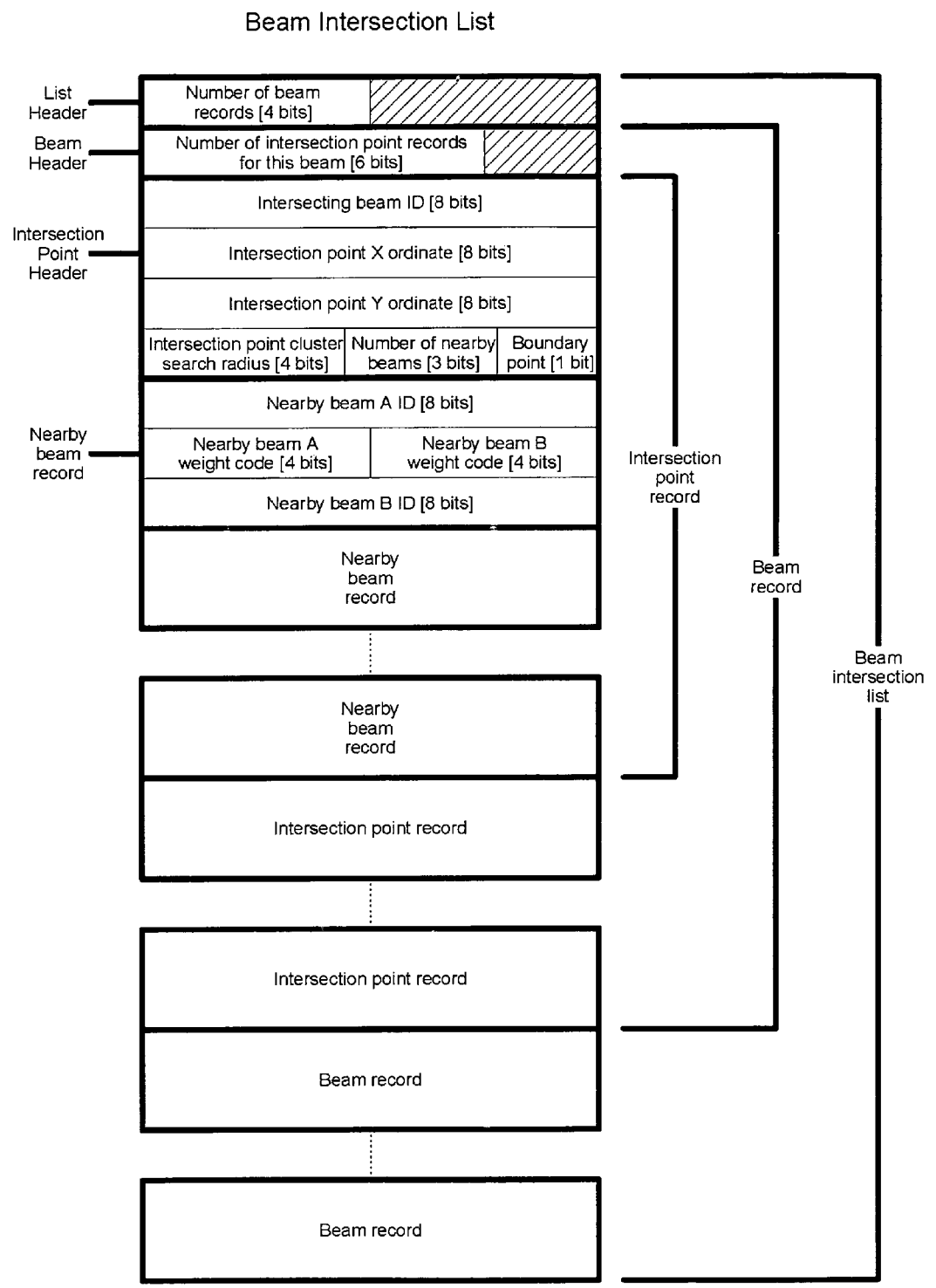
FIG. 6a illustrates the organisation of a lookup table containing beam information used in validation.

FIG. 6a is an example of the structure of such a list. For each beam, it contains a record for every intersection with another beam, as long as there is no duplicate record for the intersection elsewhere in the list. Each intersection record contains the X and Y coordinates of the intersection and the identities of the nearby/coincident beams to be tested for a candidate touch point at this intersection to be validated. It also holds a weighting code for each test beam, which determines the influence of the test beam status on the validation of the candidate touch point. The list also includes, in each intersection point record, a cluster search radius and a boundary point field, the purpose of which will be described later.

Such a table facilitates the rapid testing of a candidate touch point against many local reference beams or points to see if it represents an actual interruption or is an artefact of other interruptions.

Figure 6B:
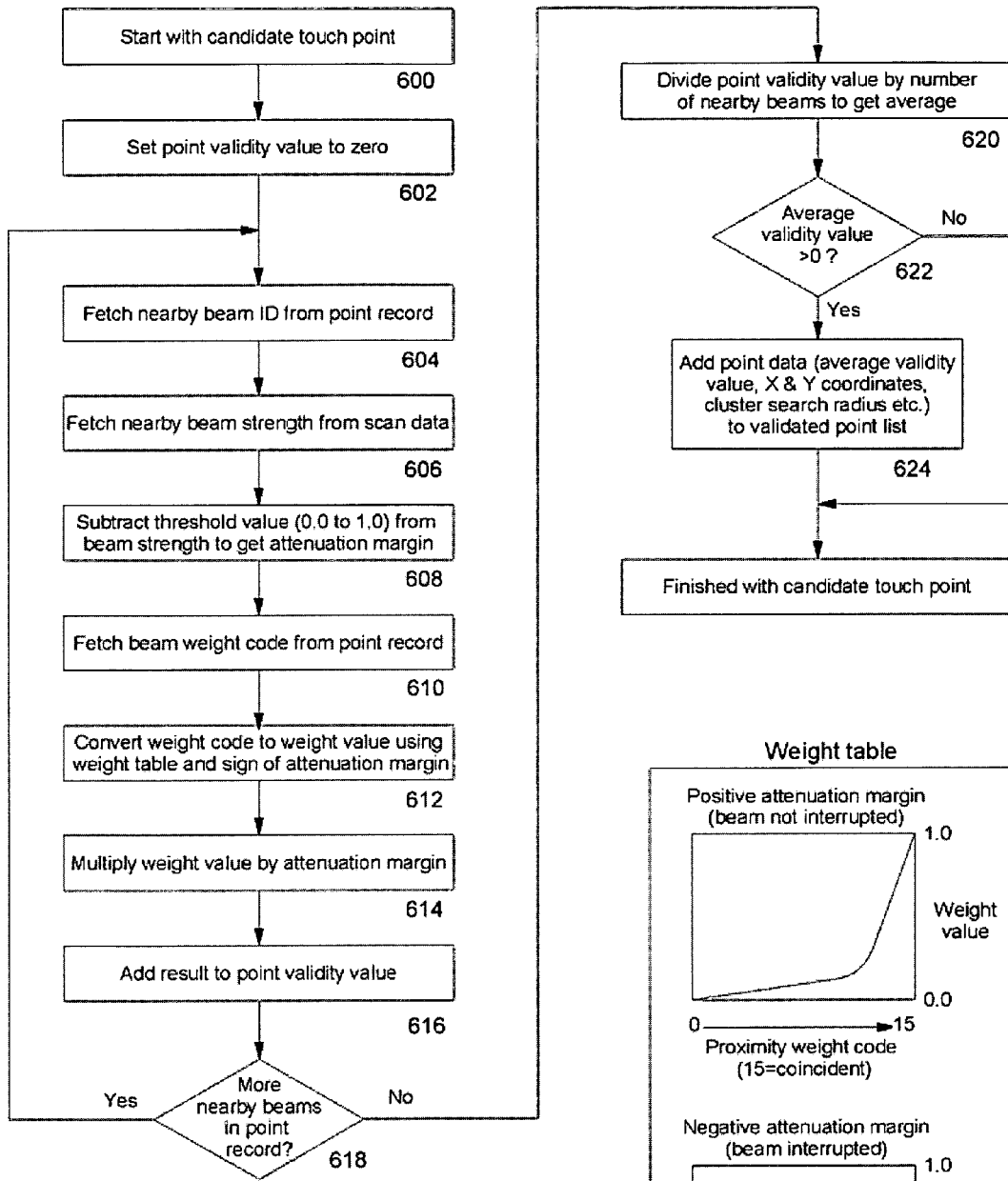
FIG. 6b is a flowchart of the steps carried out in a validation process.

FIG. 6b is a flowchart of the steps carried out by the controller 200 in the present embodiment to eliminate or validate a candidate touch point, according to the principles described above.

Starting with a candidate touch point, step 600, a parameter called the validity value of the point is set to zero at step 602. At step 604 the identity of the first of the coincident/nearby test beams to be used in validating the candidate touch point is fetched from the beam intersection list. At step 606 the strength of this test beam is obtained. This value may be a 1-bit binary value of 0 or 1 (1 corresponding to full transmission between the emitter and the detector at each end of the beam) or a higher resolution value in the same range.

At step 608 an attenuation margin is calculated by subtracting the threshold value $T_h$ from the beam strength (the beam strength is normalised in the range 0-1 and $T_h$ is a value between 0 and 1 corresponding to full transmission and complete interruption respectively). Next, step 610, the beam weight code is fetched from the beam intersection list and at step 612 the weight code is converted to a weight value using a weight table (FIG. 6c) and the sign of the attenuation margin. At step 614 the weight value is multiplied by the attenuation margin and the result added to the point validity value at step 616.

Step 618 tests whether there are more test beams to be evaluated in respect of the current candidate touch point, and steps 604 to 616 are repeated for each test beam.

When all test beams associated with the current candidate touch point have been evaluated, step 620 divides the cumulative point validity value by the number of test beams used to get the average. If the average is greater than zero, step 622, the data for that touch point is validated and added to a validated point list, step 624.

The result of the processing shown in FIG. 6b is a validated point list which contains information such as the X and Y coordinates of each point, along with the validity value of each point (a measure of confidence that the point is related to a real touch event) and various other values to be used in subsequent processing stages.

Figure 6C:
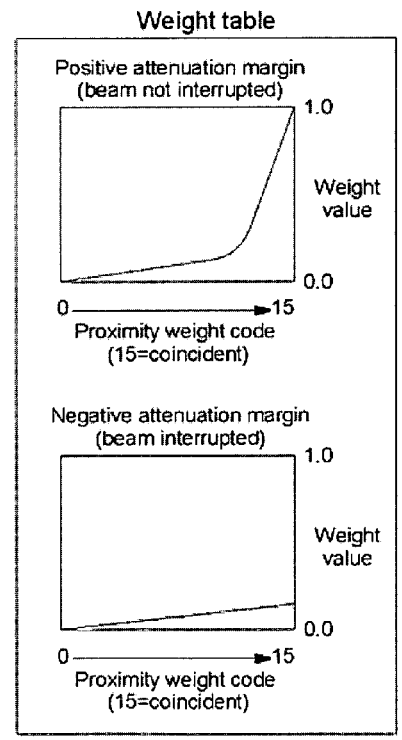
FIG. 6c is a weight table used in validation calculations.

FIG. 6c shows an example of the two sets of values used to convert from a weighting code, held in the beam intersection list, to a weighting value used in the validation calculation. FIG. 6c shows how the negating influence of an uninterrupted beam near to the candidate touch point can be made to be very much stronger than the validating effect of an interrupted beam the same distance from the candidate touch point to reduce the incidence of false positive point validations.

FIG. 7a shows two interrupted beams 78 and 80 intersecting and giving rise to a candidate touch point Q in touch area T. Another candidate touch point R is formed by the intersection of interrupted beams 82 and 84.

These candidate points Q and R could be validated using the processing shown in FIG. 6b, but more preferably with a version of the processing shown in FIG. 6b modified such that at least one of the nearby beams is required not to be interrupted for the point to be validated as a touch point. In this modified version of the algorithm, the weighting code table curves are likely to give almost equal weighting to nearby interrupted beams and to nearby uninterrupted beams.

In the modified process, the vertical beams 82 and 86 and horizontal beams 84 and 88 near to candidate touch point Q are tested to validate point Q. Since only beam 86 is not interrupted, the weighted sum of the other interrupted beams will validate the point Q. The vertical beams 78 and 94 and horizontal beams 80 and 92 are tested to validate candidate touch point R. However, since all four beams 74, 94, 80 and 92 are interrupted, the modified algorithm would eliminate candidate touch point R.

The benefit of this modification is that it has a preference for validating candidate touch points near the boundary of a touch event. This can be used to reduce the amount of data generated, particularly when the touch events have large contact areas. Also, most of the useful data about a touch event, such as the area of contact, can be determined just from the outlying points at its boundary.

Figure 7B:
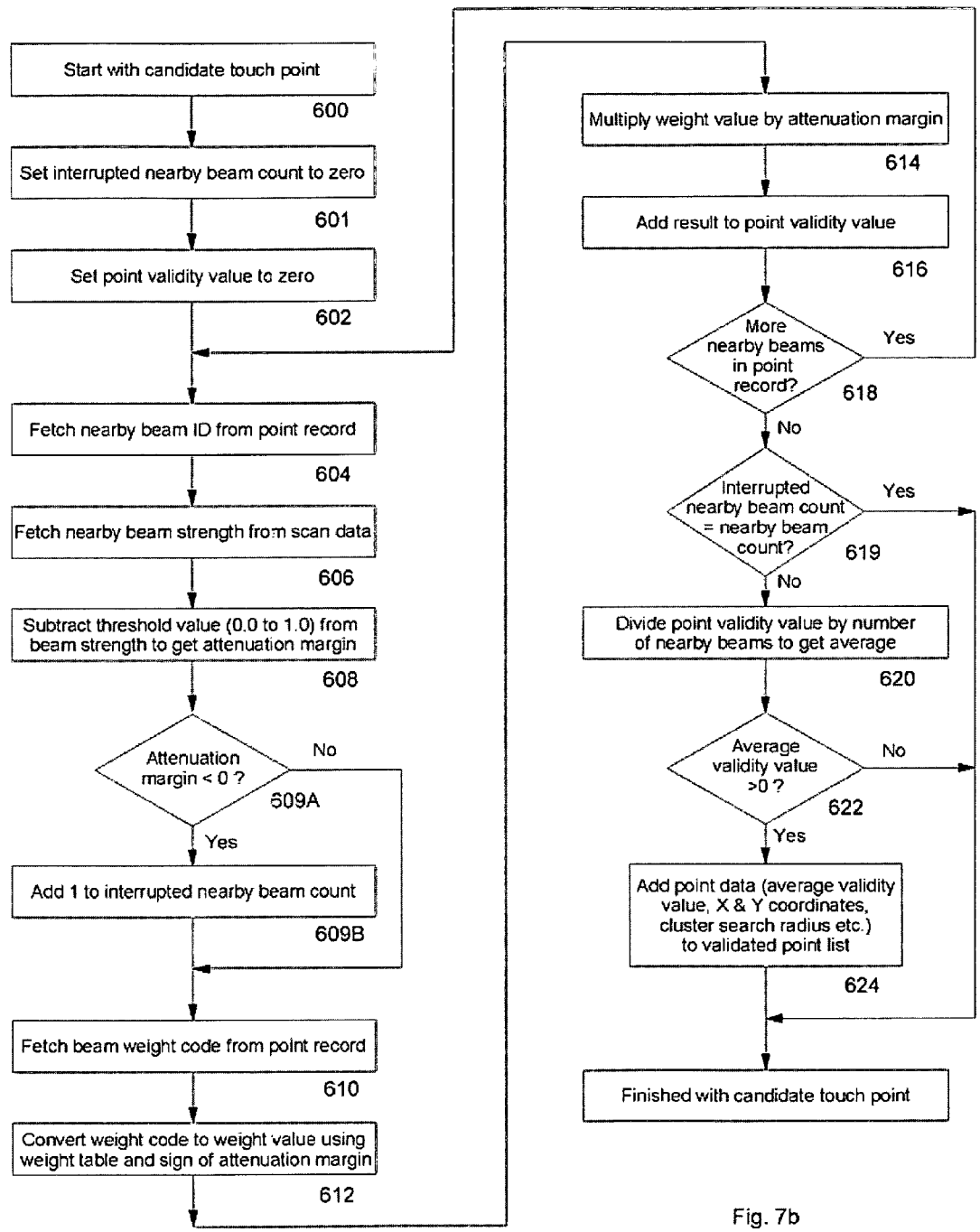

FIG. 7b is a flowchart of the modified processing algorithm to favour the validation of points around the boundary of a touch event contact area. The controller software could switch to this mode if the quantity of data being generated by the unmodified processing is excessive, owing to a large number of interrupted beams being detected.

The flowchart of FIG. 7b is the same as the flowchart of FIG. 6b but including the additional steps 601, 609A, 609B and 619. Step 601 sets a parameter called the interrupted nearby beam count to zero. Step 609A test whether the beam is interrupted (beam strength less than $T_h$) and if so 1 is added to the interrupted nearby beam count, step 609B. Step 619 tests whether all the test beams are interrupted, and if so the candidate touch point is not validated.

FIGS. 7a, 7b, 8a, 8b and 8c are representative of processing steps and data structures that may be applied to the validation of candidate touch points using nearby or coincident beams. It will be appreciated that these methods are also applicable to nearby or coincident test intersection points by reference to the beams which intersect at those test intersection points.

Figure 8A:
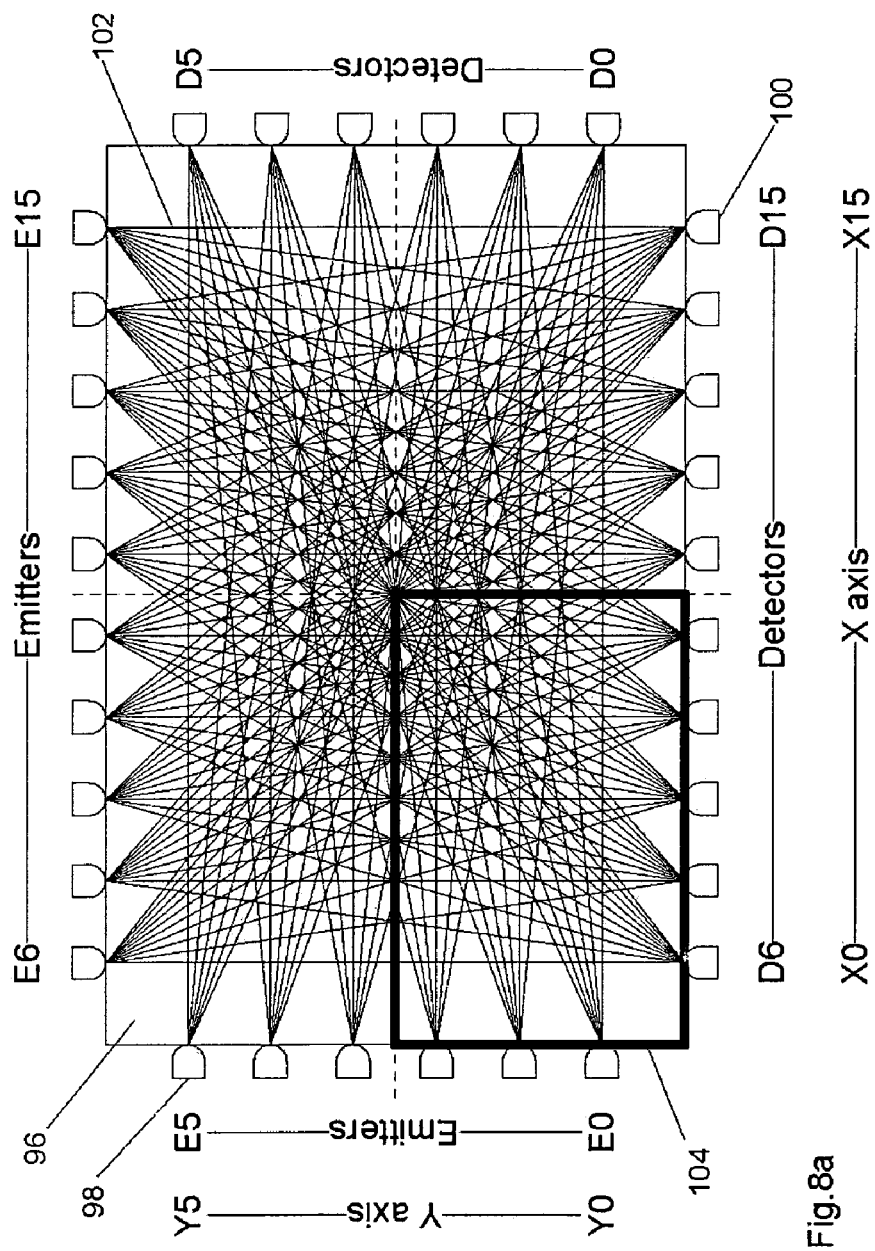

FIG. 8a shows how the symmetries in the beam pattern can be advantageously applied to reduce the storage required for data relating to beams and intersections of beams.

In the example arrangement of FIG. 8a, the touch sensitive surface 96 is surrounded by 16 emitters 98 and 16 detectors 100. It is evident from the drawing that the intersecting beams 102 form a pattern which is symmetrical both horizontally and vertically. This means that the pattern of intersecting beams 102 in a single quadrant 104 of the touch sensitive surface 96 is representative of the pattern in the other three quadrants.

This symmetry can be used to reduce the storage space required by reference data structures associated with the beam pattern. For example, the beam intersection list in FIG. 6a could have approximately one-quarter of the number of entries required to represent the entire touch sensitive surface. The 1-bit Boundary point field in the intersection point header is included to mark a beam intersection point which is along the boundary between at least two quadrants. These points need only be validated in one quadrant and ignored in all others.

FIG. 8b shows the beam line segments such as beam line segment 106 and the intersection points between beam line segments such as points 108 and 110 within a single quadrant 112. Beam line segment 106 is an example of a beam which only has a single intersection 114 at the boundary of the quadrant 112 before leaving the quadrant 112. Intersections with other parts of the beam line segment 106 outside of the quadrant 112 are processed by applying axial symmetry to the data held about the quadrant 112.

For example, the beam line segment 106 continues outside of the quadrant 112 to complete a path between emitter E15 and detector D10. Intersections with the section of beam line segment 106 which continues through the quadrant adjacent to the reference quadrant 112 can be determined by an axial symmetry about the Y axis, so that the beam endpoints E15 and D10 are translated to E6 and D11 respectively. FIG. 8b shows this reflected line segment 116 and the corresponding intersection points found within the reference quadrant 112 can be translated by performing the same axial symmetry about the Y axis to the values returned by lookup tables or lists relating to the reference quadrant 112. Intersections with beam line segments in other quadrants are handled in a similar manner.

Beam 118 in FIG. 8b intersects with beam 120 at the corner of the reference quadrant 112. There are many other beam intersections at this point, and like other intersection points along the boundary of the reference quadrant 112, it need only be validated when processing the reference quadrant 112 and ignored for all other quadrants.

Although there is a slight processing overhead in performing the axial symmetries to make use of a single reference quadrant, the saving in storage space is considerable. An example implementation of the configuration shown in FIG. 8a with the complete set of intersecting beams has a lookup table with data for 6261 unique intersection points, whereas an example implementation with a reference quadrant as shown in FIG. 8b has a quadrant lookup table with data for 1580 intersection points, the rest being derived by symmetry operations on the reference quadrant data.

The beam density varies over the touch sensitive surface (as can be seen in FIGS. 3, 4 and 8) and the minimum density is determined primarily by the spacing between the emitters and the spacing between the detectors. This spacing is chosen so that any real touch event is likely to generate several validated points. In this embodiment the validated points are gathered into clusters, where each cluster represents a touch contact area.

A lookup table can be used to store the density of beams and/or beam intersection points for each region of the touch sensitive surface. This table will facilitate the validation processing for a candidate touch point by allowing the detected amount of modulation of beams or the intersection points of beams in the vicinity of the candidate touch point to be related to the possible amount of modulation of beams or intersection points of beams for that region of the touch sensitive surface.

The table can store the values as a number of beams or beam intersection points for a given region of the touch sensitive surface. Optionally, the stored values represent the maximum or typical modulation levels expected within the given region of the touch sensitive surface when a real touch exists within that region.

Referring to FIG. 9a, the outline 122 of the contact area of the touch event contains several validated points such as points 124, 126 and 128 which will be in the validated point list generated by the processing described in FIGS. 6b and 7b. The outline 122 of the touch event contact area also contains some points which were not validated, such as point 130. The validated point list need not be in any particular order, so a clustering algorithm is used to gather together by a cluster reference any validated points which are very likely to belong to the same touch event.

Referring still to FIG. 9a, an example validated point list may have validated point 124 as its first entry. Initially, no cluster numbers will have been allocated to any points. Starting with point 124 as the seed point for a cluster, it is first assigned a cluster number. Next, a search is done within a radius 132 around the point 124 for other validated touch points, but which have not been assigned to a cluster. In this example, validated points 126 and 128 which have not been assigned to a cluster are found within the radius 132 of point 124. The points 134 and 136 which were not validated are also within the radius 132 of point 124, but are ignored. Then, the point 126 is assigned to the same cluster as point 124 and a search is done within a radius 138 of point 126 for validated touch points which have not been assigned to a cluster. None are found, so the focus of the processing moves to point 128 and so on.

Since the spacing between beam intersection points varies greatly across the touch sensitive surface, the clustering algorithm may use a maximum clustering search radius determined for the particular part of the touch sensitive surface which is being searched or for the particular point around which the search is to be done. The search radius may be calculated as needed or held in a lookup table or a list such as the list shown in FIG. 6a.

Figure 9B:
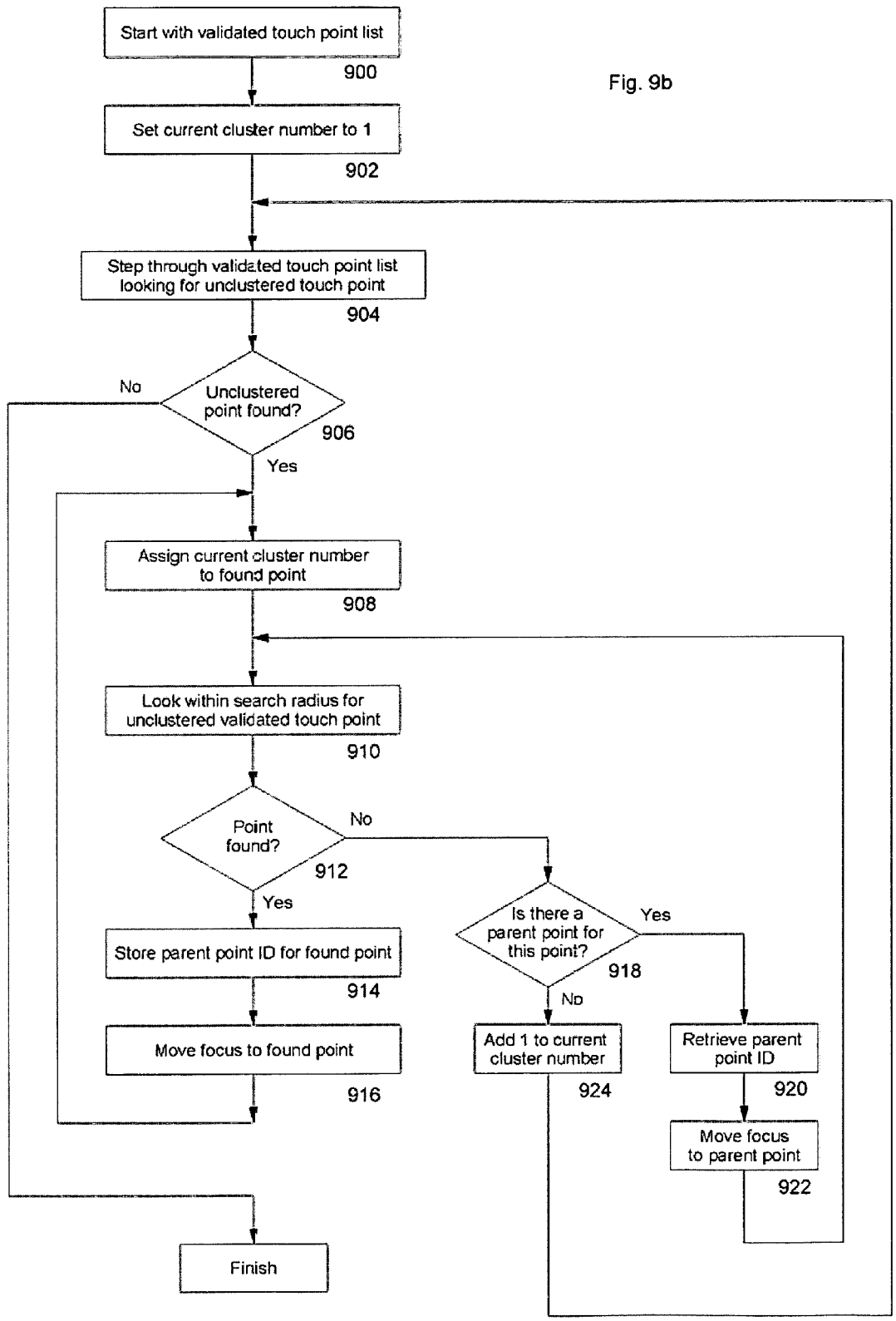
FIG. 9b is a flowchart of the clustering process.
Figure 10A:
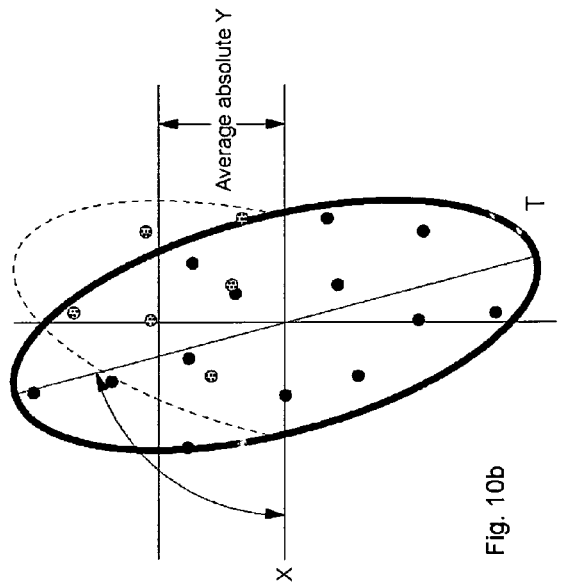
FIG. 10 shows a method of estimating the degree of rotational symmetry of a cluster and its orientation.
Figure 10B:
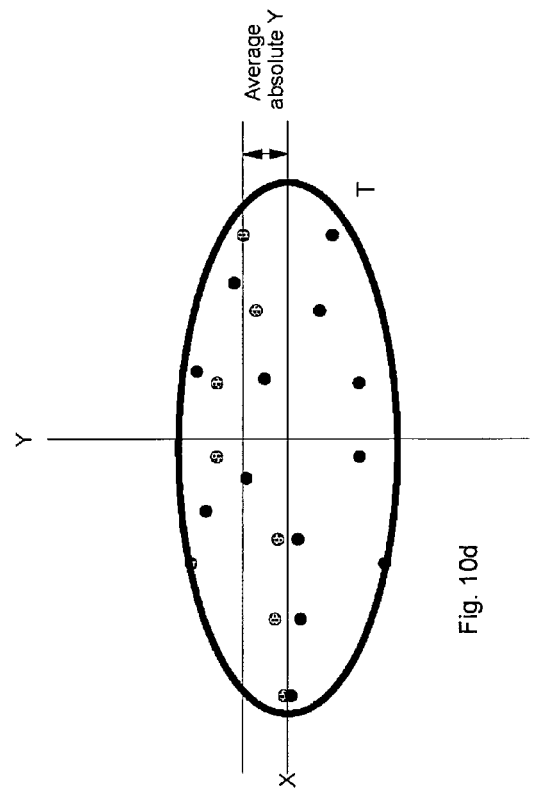
Figure 10C:
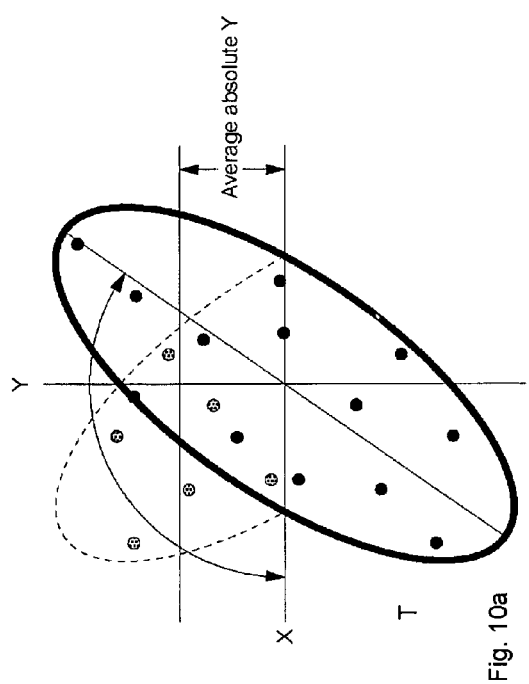
Figure 10D:
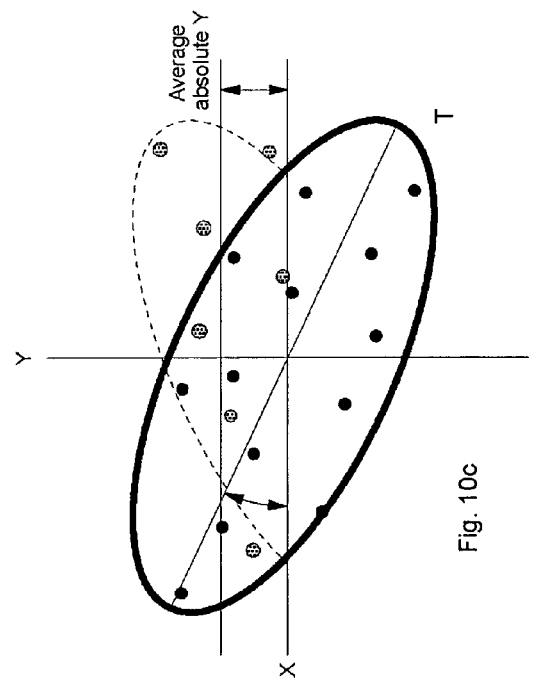

FIG. 9b is a flowchart of the clustering process carried out by the controller 200. Starting with the validated touch point list, step 900, the current cluster number is set to 1, step 902, and the first unclustered touch point identified, steps 904 and 906. In fact, for the first cluster none of the touch points will have been clustered, so steps 904 and 906 identifies the first touch point in the list. At step 908 the current cluster number is assigned to the identified unclustered touch point. At step 910 the area within the search radius is searched for an unclustered validated touch point and if found, step 912, the original point (i.e. the point found at step 906) is identified at step 914 as a parent point for the point found at step 912. Now, step 916, the focus moves to the new point found at step 912 and the algorithm cycles through steps 908 to 916 until no further points are found at step 912. In that case step 918 tests to see if there is a parent point for the last point found at step 912. If so, the focus is moved to the parent point, steps 920 and 922, and the algorithm cycles around the loop 908 to 916 for the parent point. When no more points are found at steps 912 and 918 the cluster is complete, step 924, and the algorithm returns to the next unclustered touch point, step 904. At the end of this process, all points in the validated point list will have been assigned to a cluster.

In a similar way to the validation only of candidate touch points around which there is at least one uninterrupted beam, a validated touch point may be discarded from a cluster if all of the beam intersection points around it are also validated touch points. Small touch contact areas which generate a cluster with only a single validated touch point can still be valid, but the position resolution will be that of the underlying intersection pattern in the region of the touch event. Depending on the application, clusters of small area may be discarded as spurious. Excessively large clusters may also be discarded.

Further processing of clusters can be performed to determine the centre point and size (span and area) of each cluster, its rotational symmetry and, if it is significantly non-symmetrical by rotation, its orientation.

To estimate the centre position of a cluster, an average of the X ordinates and an average of the Y ordinates of the points in the cluster can be performed. The resulting average X and average Y values can be used as an estimated centre point. Since the distribution of beam intersection points over the touch sensing surface is not uniform, a more representative centre point may be estimated by averaging the X ordinates and Y ordinates of only the outlying members around the boundary of a cluster.

In some applications, an indication of the bounding area of the cluster by using the smallest and largest X ordinates of any points in the cluster and the smallest and largest Y ordinates of any points in the cluster. The depth of modulation of the beams at a cluster member point can be used as a weighting factor for improved resolution. The radial distance from the estimated centre of the cluster to the outlying points in the cluster can also be used to determine the span of the touch contact area.

Well known methods can be used to calculate the area of a cluster, such as dividing the bounding outline of the cluster into triangular polygons (the estimated centre of the cluster can be used as one apex of each triangle) and adding the areas of all of the polygons.

FIGS. 10a to 10d show an example method of estimating the degree of rotational symmetry of a cluster and its orientation.

The validated points in the cluster are mathematically rotated by the controller around the estimated centre of the cluster by successive amounts over a 180 degree range. For each angle of rotation, the average absolute Y ordinate of the points in the rotated cluster is calculated and the minimum average value will be obtained when the orientation axis of the cluster is substantially aligned with the X axis. This process can be performed using all of the points in a cluster, or just the points on or near the perimeter of the cluster.

The variation in the average absolute Y value through all of the test angles indicates the degree of rotational uniformity of the cluster. A large variation indicates that the cluster shape is not approximately circular. Ideally, there will only be one pronounced minimum during the rotation to indicate that the cluster has a distinct main axis of orientation.

The cluster orientation can be used as an additional parameter to be passed to a processing system to which the touch overlay is connected, along with the size, centre location and other data relating to every touch event. Changes in cluster orientation can be applied as a rotary motion to controls or other graphics which may be rendered on the associated display panel. For example, a rotary audio level control drawn graphically on a display under the touch overlay could be turned up by placing a finger over the displayed control substantially parallel to the touch overlay and, while remaining in contact with the touch overlay, turning the finger clockwise and causing the associated graphical control to point to a higher level value. Placing two fingers which are tightly together on the control and turning the whole hand will give a similar result.

FIGS. 11a to 11e show how the orientation of a cluster which is substantially non-circular can be used as a control value.

FIG. 11a shows the rotation between the two finger angles at position 1 and then turning the finger to arrive at position 2. FIG. 11b shows the validated point cluster rotation associated with the finger rotation shown in FIG. 11a, and FIG. 11c shows the orientation axis rotation derived from the cluster rotation shown in FIG. 11b.

FIG. 11d shows an example rotary control graphic on an LCD or similar display device associated with the touch sensitive overlay. FIG. 11e shows the example rotary control graphic image having been rotated by an amount linked to the rotation of the touching finger between position 1 and position 2 in FIG. 11a.

The angle between the centres of two separated clusters can be used in a similar way.

Figure 12:
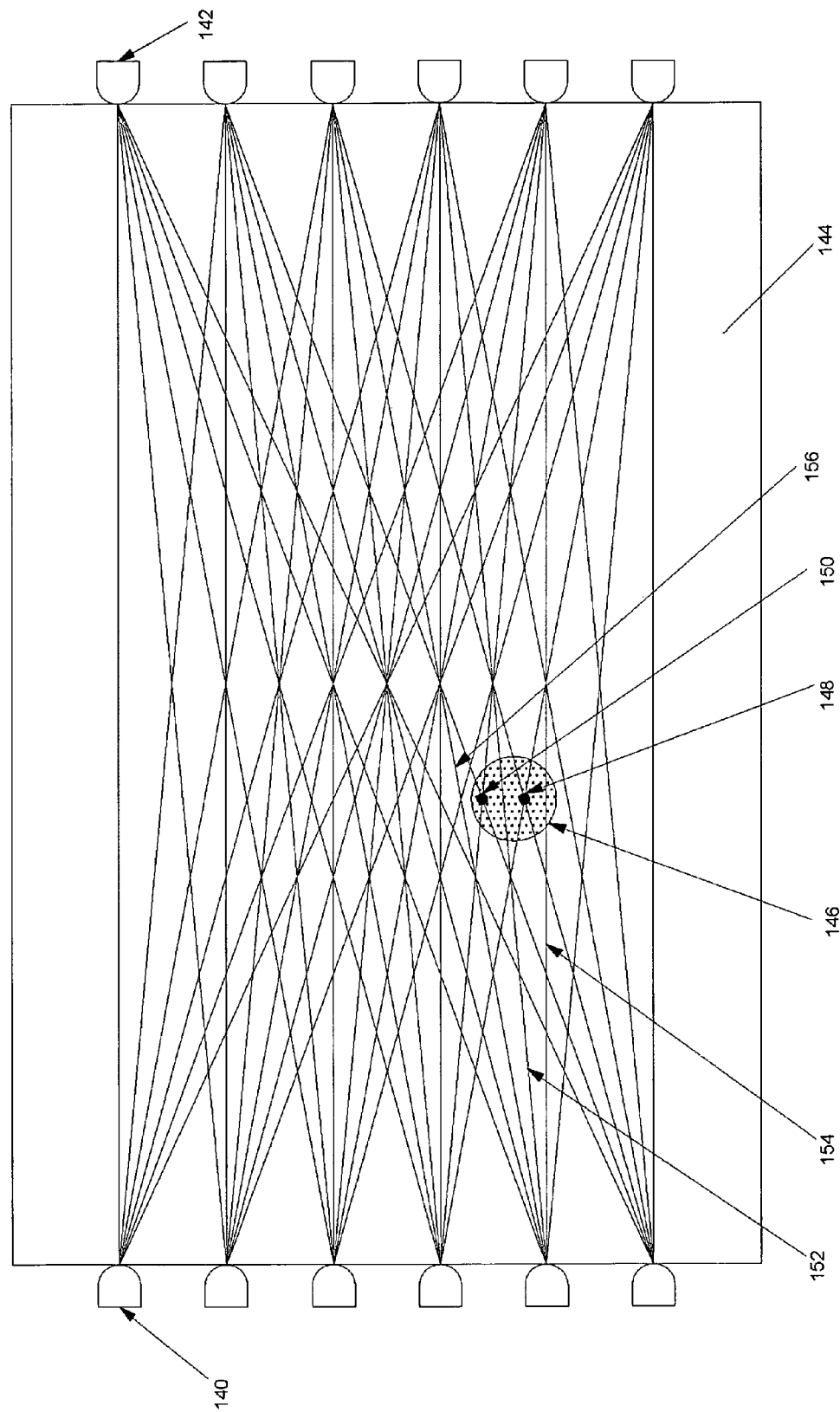
FIG. 12 is an embodiment of the invention applied to a single axis scanning system.

FIG. 12 shows a single axis scanning system using the status of beams passing near to a candidate touch point at the intersection of at least two interrupted beams as additional data with which to validate the candidate touch point. A single axis scanning system means a touch sensitive optical control device with emitters and detectors arranged only along opposite edges of a touch sensitive surface.

In FIG. 12 an array of emitters 140 and detectors 142 are arranged on two opposite sides of a rectangular touch sensitive surface 144. A touch point 146 in FIG. 12 interrupts the beam pairs at the intersection points 148 and 150 and also interrupts beams 152 and 154. The intersection point 148 is a candidate touch point which can be validated by testing beam 146 and beam 152. In this example, both beam 146 and beam 152 are interrupted and the point 148 is validated. The intersection point 150 is a candidate touch point which can be validated by testing beam 152 and beam 156. In this case, the beam 152 is interrupted while beam 156 is not, so candidate touch point 150 is likely to be eliminated.

In general, candidate touch points can be generated from intersecting beams passing between a linear array of emitters along one side of the touch sensitive surface and a parallel array of detectors along the opposing side. Beams used for validating a candidate touch point can pass from the same array emitters to the same array of detectors, so a second axis of emitters and detectors is not necessarily required to implement the present invention. This facilitates robust detection of a touch with an absolute minimum number of emitters and detectors.

A panel traversed by beams can, in addition to the detection of touch events, detect the operation of mechanical control devices arranged along the beam path. For example, a mechanical button control may be inserted along a beam path whereby the button control presents a minimal attenuation to optical energy when the button actuator is in its resting position, but introduces significant optical attenuation when the button actuator is pressed. This may be accomplished by introducing an opaque vane into the path of the beam when the button is pressed. Various mechanical designs for control devices may be used to modulate the optical energy passing along the beams such that the status of such control devices can be detected by processing the signals from the optical detectors.

Although the present invention is primarily intended for use with discrete light detectors such as phototransistors or photodiodes, it may be advantageously be applied to systems making use of light-dependent resistors, integrated linear arrays, cameras or other multi-element optical detection devices.

Although the present invention has been described using beam attenuation as the mode of modulation attributable to a touch, other modulation types, such as the increased intensity of a beam due to reflection off a touching object or due to focussing by a touching objected are also contemplated and within the scope of the invention.

Using the invention, the storage and processing requirements are modest, even in a high-resolution implementation.

The present invention is not limited to the embodiments described herein but can be amended or modified without departing from the scope of the invention.

The invention claimed is:

1. A method for determining a touch point on a touch-sensitive optical device comprising a plurality of optical emitters and a plurality of optical detectors, the optical emitters and the optical detectors defining therebetween a plurality of optical beam paths forming an optical beam intersection pattern extending over an area, the method comprising the steps of:
   detecting a modulation of energy in beams transmitted along each of a pair of optical beam paths;
   assigning a candidate touch point at the intersection of said pair of modulated beams;
   accessing stored data from a database defining predetermined other beams or predetermined other beam intersections near to or coincident with said candidate touch point, wherein the stored data includes respective weighting and/or proximity values relating to the predetermined other beams or predetermined other beam intersections;
   analyzing said predetermined other beams based at least in part on said stored data; and
   responsive to said analysis, determining whether the candidate touch point is an actual touch point.

2. The method of claim 1, wherein said step of assigning is based on a function of the degree of modulation of the predetermined other beams.

3. The method of claim 2, wherein the contributions of the predetermined other beams are weighted in said function dependent on the degree of modulation.

4. The method as claimed in claim 3, wherein the weighting for each predetermined other beam depends upon one or more of a proximity of the predetermined other beam to the candidate touch point; an angle of the predetermined other beam to an angle of the modulated beam defining the candidate touch point; and a number of predetermined other beams.

5. The method as claimed in claim 1, wherein the beam intersection pattern is symmetrical about at least one axis of the area of optical beam paths, and wherein accessing further comprises:
   retrieving from the stored data information regarding symmetric beams on one side of said at least one axis;
   extrapolating the symmetric beam data for the predetermined other beams on a symmetrically opposite side of said at least one axis based on said stored data.

6. The method as claimed in claim 1, further comprising:
designating said modulation as an interruption of the modulated beam if said modulation exceeds a threshold level,
and wherein assigning further comprises assigning said candidate touch point responsive to determining that both modulated beams are interrupted.

7. The method as claimed in claim 6, wherein said threshold level is an adaptive threshold level.

8. The method as claimed in claim 6, designating comprises comparing the detected modulation with a predefined modulation level for that touch point region.

9. The method as claimed in claim 8, further comprising retrieving stored data from the database, the stored data including the typical threshold level indicative of a typical modulation level for an actual touch point for that touch point region.

10. The method as claimed in claim 9, wherein said data comprises one or more of the following: a number of beams passing through the touch point region; a number of intersections of any beams falling within the touch point region; or a maximum modulation to be expected in the touch point region.

11. The method as claimed in claim 1, further comprising the step of grouping actual touch points into clusters based on a search radius distance from a cluster member to at least one other member of the same cluster.

12. The method as claimed in claim 11, wherein said beam intersection pattern is non-uniform and said search radius distance varies according to the position of the cluster member in the beam intersection pattern.

13. The method as claimed in claim 11, further comprising the step of estimating the centre of a cluster as the average position of all of the cluster members.

14. The method as claimed in claim 11, further comprising the step of estimating the centre of a cluster as the centre of a bounding rectangle around the cluster.

15. The method as claimed in claim 11, further comprising the step of estimating the centre of a cluster as the average position of outlying cluster members.

16. The method as claimed in claim 13, wherein said estimation step is based on a weighted average, the weights depending on the degree of modulation of a plurality of beams at each actual touch point contributing to the average.

17. The method as claimed in claim 1, further comprising determining an orientation of a non-circular touch contact area by mathematically rotating at least two actual touch points lying on or near the perimeter of the contact area around an estimated centre of the contact area and determining a minimum or maximum average absolute value of a distance between each actual touch point and a fixed axis.

18. The method as claimed in claim 1, comprising the steps of:
initialising a point validity value for said candidate touch point;
selecting a predetermined other test beam near to or coincident with said candidate touch point;
measuring a strength of said predetermined other test beam;
calculating an attenuation margin for said predetermined other test beam based on said measured beam strength;
multiplying said attenuation margin by a weighting value;
adding the weighted attenuation margin to said point validity value;
repeating the selecting, measuring, calculating, multiplying, and adding steps for a plurality of predetermined other beams near to or coincident with said candidate touch point;
normalizing said point validity value; and
responsive to said point validity value exceeding a threshold value, designating said candidate touch point as an actual touch point.

19. The method as claimed in claim 18, wherein said point validity value is initialised to 0.

20. The method as claimed in claim 18, wherein calculating further comprises subtracting a threshold value from said measured beam strength.

21. The method as claimed claim in 18, wherein normalizing further comprises dividing said point validity value by the number of predetermined other beams.

22. The method as claimed in claim 1, further comprising storing an indication of said actual touch point in a validated point list.

23. The method as claimed in claim 1, further comprising:
determining whether the candidate touch point is near the boundary of a touch event: and
wherein said steps of analyzing and determining whether the candidate touch point is an actual touch point are carried out only in respect of those candidate touch point near the boundary of a touch event.

24. A touch-sensitive optical device comprising a plurality of optical emitters and a plurality of optical detectors, the optical emitters and the optical detectors arranged relative to a touchable surface such that energy transmitted by the emitters is received
by the detectors along multiple intersecting beams which pass adjacent the surface, and wherein touching the surface at a beam causes a detectable modulation of the energy transmitted along the beam, the device further comprising a processing means operable to perform the following steps:
detect a modulation of energy in beams transmitted along each of a pair of optical beam paths;
assign a candidate touch point at the intersection of the pair of modulated beams;
access stored data from a database defining predetermined other beams or predetermined other beam intersections near to or coincident with said candidate touch point, wherein the stored data includes respective weighting and/or proximity values relating to the predetermined other beams or predetermined other beam intersections;
analyze said predetermined other beams based at least in part on said stored data; and
responsive to said analysis, determine whether the candidate touch point is an actual touch point.

* * * * *